United States Patent
Kim et al.

(10) Patent No.: US 6,493,333 B1
(45) Date of Patent: Dec. 10, 2002

(54) DEVICE AND METHOD FOR CONTROLLING TRANSMISSION POWER OF PUNCTURED FRAME

(75) Inventors: Jae-Yoel Kim, Kyonggi-do (KR); Jae-Min Ahn, Seoul (KR); Young-Ky Kim, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/333,192

(22) Filed: Jun. 14, 1999

(30) Foreign Application Priority Data

Jun. 13, 1998 (KR) ............................................. 98-22214

(51) Int. Cl.⁷ ............................................. H04B 7/216
(52) U.S. Cl. ........................ 370/342; 455/522; 455/437; 455/116

(58) Field of Search ................................. 370/335, 342, 370/331; 455/69, 522, 116, 127, 437

(56) References Cited

U.S. PATENT DOCUMENTS 6,078,570 A * 6/2000 Czaja et al. ................. 370/331

* cited by examiner

*Primary Examiner*—Lee Nguyen
(74) *Attorney, Agent, or Firm*—Dilworth & Barrese, LLP

(57) ABSTRACT

A code division multiple access (CDMA) mobile communication system for controlling power for a traffic signal of one frame includes: a signal generator for simultaneously generating a pilot signal and the traffic signal on a frame basis; a power compensator for compensating the power of the traffic signal according to a punctured length of a punctured frame among the frames; and a signal combiner for combining the power-compensated traffic signal and the pilot signal generated from the signal generator.

10 Claims, 6 Drawing Sheets

DEVICE AND METHOD FOR CONTROLLING TRANSMISSION POWER OF PUNCTURED FRAME

BACKGROUND OF THE INVENTION

1. Field of the Invention

The present invention relates to a power control device and method for a mobile communication system, and more particularly, to a power control device and method of controlling a gain of pilot signals and a gain of traffic signals in a different manner, respectively.

2. Description of the Related Art

It is common to employ code division multiple access (CDMA) technology for a mobile communication system. The CDMA mobile communication system employs power control for forward link and reverse link. In the CDMA mobile communication system, a receiver of a mobile station receives pilot signals via a pilot channel, which is among the channels used for receiving frame signals transmitted from a transmitter of a base station, and measures the strength of the received pilot signals. The receiver generates a power control signal based on the strength of the pilot signals and sends the generated power control signal back to the transmitter. Concretely, the receiver compares the strength of the pilot channel signal with a reference value (or threshold) for the power control. If the strength of the pilot channel signal is lower than the reference value, the receiver sends a power-up signal; otherwise, the receiver sends a power-down signal back to the transmitter.

In the case where the channel surroundings are poor during communication with a base station (a first base station) at a first frequency having a specific frequency range, a mobile station searches for another base station (a second base station) with better channel surroundings that uses a second frequency having a different frequency. If the searching result indicates that the signal strength of the second base station is better than that of the first base station, the mobile station performs a hard handoff (an interfrequency hard handoff) from the first base station to the second base station. The searching process, a preliminary step that the mobile station performs for a hard handoff, will be described in the following. The mobile station changes the first frequency as a communication frequency to the second frequency in order to search the second base station for a predetermined time period. Then the mobile station receives the pilot signals from the second base station at the second frequency before returning to the original first frequency. In some cases, transmission of the traffic signals in the mobile station may be discontinued to the presently connected first base station during an interval where the pilot signals are received from the second base station at the new second frequency.

As stated above, the traffic signals are punctured during an interval where the pilot signals are received at another frequency, resulting in a loss of energy. In order to compensate for the loss of energy, the transmitter increases power of the non-punctured frame signals. This is further detailed below.

Generally, the amplitude of a signal denotes a gain or power. The power is the square of a gain. Hereinafter, it will be given to you uniformly as a gain regarding the amplitude of the signal.

FIG. 1 illustrates a device for controlling gain during transmission of a punctured frame on a reverse link, in accordance with the related art, in which signals are composed of pilot signals and traffic signals. Referring to FIG. 1, a controller 100 controls the entire operation of a receiver. The controller 100 controls a pilot signal generator 110, a traffic signal generator 120, and a first signal controller 180 according to signalling information, e.g., data rate, puncturing start time and puncturing interval, etc., received from an upper layer. Under the control of the controller 100, the pilot signal generator 110 generates pilot signals and outputs the generated pilot signals to a first gain controller 130. Upon receipt of the pilot signals, the first gain controller 130 controls the gain of the pilot signals using a predetermined gain $G_P$ and outputs the gain controlled pilot signals to a signal combiner 150. Similarly, the traffic signal generator 120, under the control of the controller 100, generates traffic signals and outputs the generated traffic signals to a second gain controller 140. Upon receipt of the traffic signals, the second gain controller 140 controls the gain of the traffic signals using a predetermined gain $G_T$ and outputs the gain controlled traffic signals to the signal combiner 150. A ratio of the pilot gain from the first gain controller 130 to the traffic gain from the second gain controller 140 is set to a predetermined value. The signal combiner 150 combines the traffic signals and the pilot signals received from the first and second gain controllers 130 and 140, respectively.

Also, the controller 100 calculates a compensation gain for a puncturing interval based on information concerning the puncturing start time and puncturing interval received from the upper layer. After completion of the calculation, the controller 100 outputs the puncturing interval and the calculated compensation gain to the first signal controller 180. Then, the first signal controller 180 outputs the received compensation gain to a multiplier 170 during the puncturing interval.

The multiplier 170 multiplies the combined signals of the pilot signals and the traffic signals as, outputted from the signal combiner 150, by the compensation gain, and outputs the result to a second signal controller 160. The second signal controller 160 receives the compensated pilot signals and traffic signals and adjusts power control according to the condition of the transmission channels. If a mobile station searches for another base station having a different frequency, puncturing occurs after signal controlling is performed by the second signal controller 160. Thus, both the pilot signals and the traffic signals are punctured during the same time interval.

FIG. 2 illustrates gain distribution for a punctured frame. When a frame is not punctured, the non-punctured frame will be transmitted with a constant gain $G_A$ without a gain loss over the entire frame duration A. However, when the frame is punctured causing a gain loss $G_A$ at a punctured duration $A_P$, the non-punctured durations B increase in gain by $G_B$ to compensate for the gain loss $G_A$ at the punctured duration Ap. In conclusion, the total gain for the punctured frame outputted from the multiplier 170 is $G_{Total}=G_A+G_B$.

In the case where the punctured frame is transmitted in the above gain control method, the transmission gain for the non-punctured portion is increased consequently causing an increase in the transmission gain for the pilot signals, which results in the estimated gain of the pilot channel being higher than a reference value during most time intervals. Thus, the gain control signal is generated as a gain-down signal. This gain control method however cannot provide maintenance of a reception performance at the receiver, since the reception performance for decoding the punctured frame is maintained only with a continuous increase in the gain by that time interval for decoding the punctured traffic frame. To avoid such an impairment, the transmitter performs gain control ignoring the gain-down signal among the gain control signals fed back from the receiver, after having decreased during fading and having then recovered therefrom.

As described above, the transmitter ignores the gain-down signal among the gain control signals fed back from the receiver such that only the gain-up signal is activated with the gain-down signal inactivated after having recovered from a deep fading, resulting in a waste of gain.

Furthermore, another problem arises in that data transmission with high gain causes an increase in interference on the reverse link and reduces the capacity of the reverse link.

SUMMARY OF THE INVENTION

It is, therefore, an object of the present invention to provide a device and method for controlling gain during the transmission of a punctured frame, in which the punctured traffic data frame can be gain controlled under a gain-up/down signal in the same manner as a non-punctured traffic data frame by controlling the gain for the gain of the punctured traffic data frame only, and without compensating the gain for pilot signals.

In accordance with an aspect of the present invention, a code division multiple access (CDMA) mobile communication system for controlling gain for a traffic signal of one frame is provided, including: a signal generator for generating a pilot signal and the traffic signal on the frame basis; a gain compensator for compensating the gain of the traffic signal according to a punctured length of a punctured frame among the frames; and a signal combiner for combining the gain-compensated traffic signal and the pilot signal generated from the signal generator.

In accordance with another aspect of the present invention, a gain control method in transmission of a punctured frame in a mobile communication system is provided, including the steps of: determining whether an input frame during a hard handoff is punctured or not; when the frame is punctured, determining whether information is received regarding a data rate of the frame and a punctured length; when the information is received, calculating a compensation gain from the data rate and the punctured length; determining whether a frame boundary is detected or not; and when the frame boundary is detected, generating the compensation gain to a multiplier to compensate a loss of gain for traffic signals.

BRIEF DESCRIPTION OF THE DRAWINGS

The above and other objects, features and advantages of the present invention will become more apparent from the following detailed description when taken in conjunction with the accompanying drawings in which like reference numerals indicate like parts.

DETAILED DESCRIPTION OF THE PREFERRED EMBODIMENT

A preferred embodiment of the present invention will be described herein below with reference to the accompanying drawings. In the following description, well known functions or constructions are not described in detail since they would obscure the invention in unnecessary detail.

In a gain control method according to the present invention, a ratio of pilot signal gain to traffic signal gain is different for a punctured frame and a non-punctured frame. That is, when the traffic frame is not punctured, the pilot signals and the traffic signals are controlled with respect to their transmission gain with a pilot signal gain gain (hereinafter, called $G_P$) and a traffic signal gain gain (hereinafter, called $G_T$), respectively; and when the traffic frame is punctured, the $G_P$ is maintained and only the $G_T$ is given a compensation gain for the transmission signals the loss of gain. When gain for the pilot channel to generate a gain control signal is measured in this case, it is possible to produce the same gain control signal irrespective of the punctured frame or the non-punctured frame of the transmission signal, and also to perform gain control with respect to the gain control signal fed back to a transmitter that generates the punctured frame.

There are two methods according to the present invention for performing a gain control where the pilot signals' gain ratio differs from that of the traffic signals'.

In a first method, each frame of the traffic signal is monitored during an inter-frequency hard handoff to determine if any frames are punctured. When a punctured frame is detected, the compensation gain is calculated and then only the traffic signals are compensated for a loss of gain according to the compensation gain as calculated prior to the stage where the pilot signals and the traffic signals are combined together.

In a second method, a predetermined compensation gain for a length of the puncturing interval is stored in a memory and, when a punctured frame is input, a corresponding gain value $G_T$ is read out from the memory for compensation. A loss of gain is proportional to the puncturing time and may be restricted according to a maximum gain value that the transmitter can transmit. It is also possible to determine the compensation gain differently from the loss of gain in order to compensate for the deterioration of performance of the traffic channel that may be incurred due to an inappropriate gain ratio between the traffic signals and the pilot signals.

Figure 6:
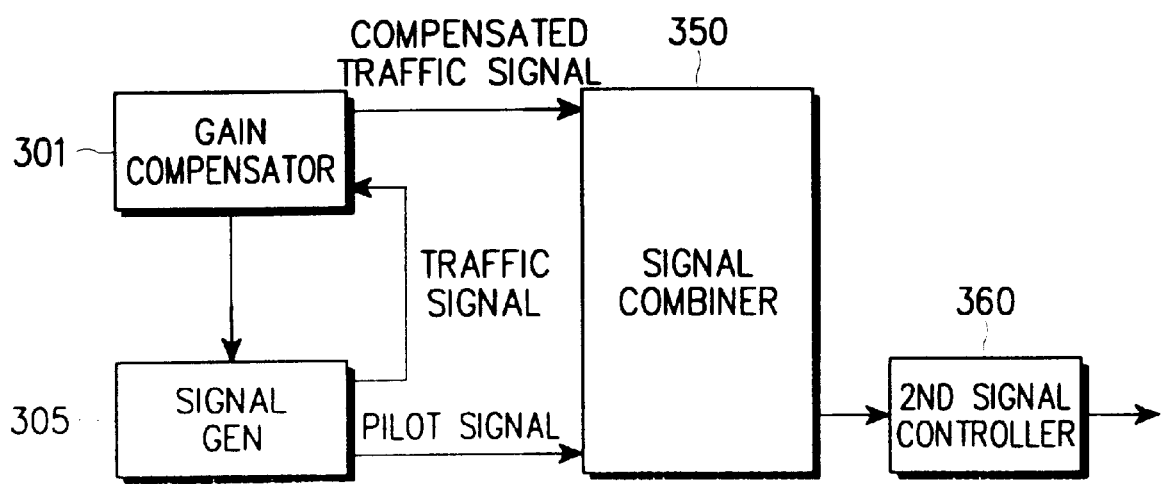
FIG. 6 is a schematic block diagram illustrating a device for controlling gain during transmission of a punctured frame according to an embodiment of the present invention.

FIG. 6 illustrates a device for controlling gain during transmission of a punctured frame according to an embodiment of the present invention.

A gain compensation device according to the present invention comprises a gain compensator 301, a signal generator 305, a signal combiner 350 and a second signal controller 360. The signal generator 305, under the control of a controller (not shown), generates traffic signals and pilot signals. The pilot signals are provided to the signal combiner 350 and the traffic signals are provided to the gain compensator 301. The gain compensator 301 receives data rate information from an upper layer to control the signal generator 305, which generates the traffic signals and the pilot signals. The gain compensator 301 also receives puncturing information for a puncturing start time and a puncturing interval from the upper layer in order to calculate a compensation gain so that the gain of the traffic signals received from the signal generator 305 are compensated for using the calculated compensation gain. The gain compensator 301 then outputs the compensated traffic signals to the signal combiner 350. The signal combiner 350 combines the compensated traffic signals received from the gain compensator 301 with the pilot signals from the signal generator 305, and outputs the combined signals to the second signal controller 360. The second signal controller 360 controls the gain of the combined signals received from the signal combiner 350.

Figure 1:
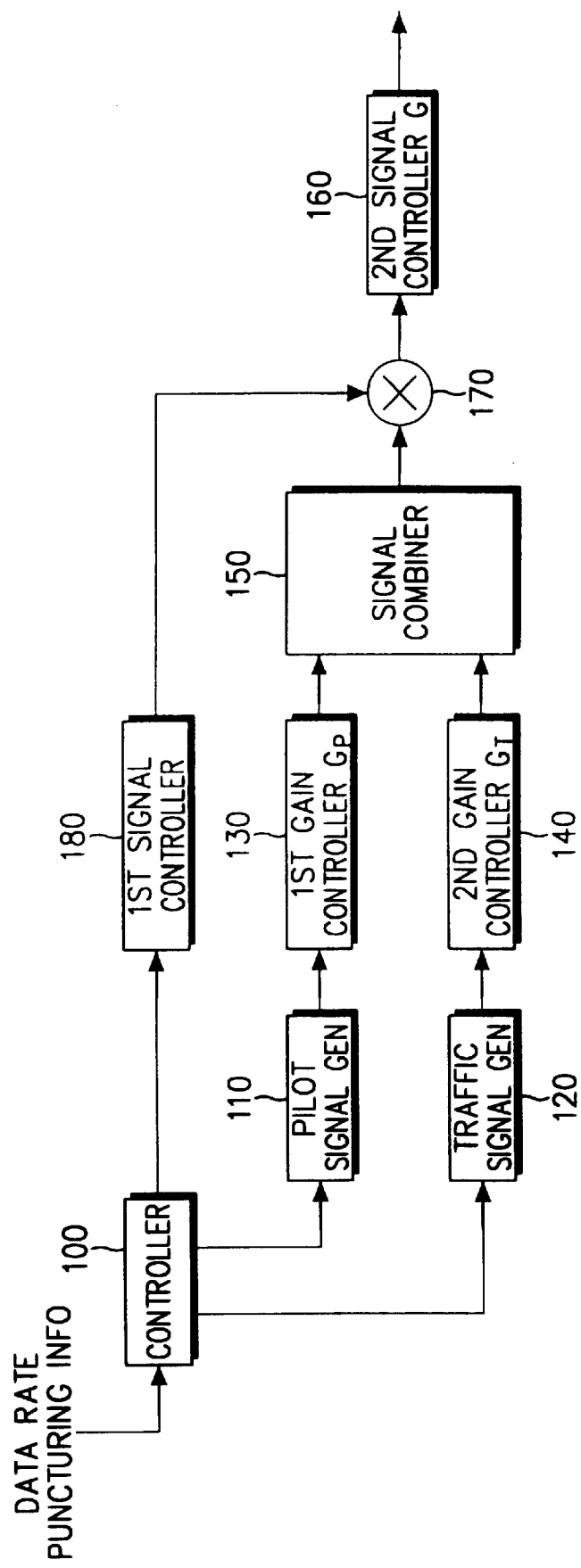
FIG. 1 is a diagram illustrating a structure of a gain control device on a reverse link according to a related art.
Figure 2:
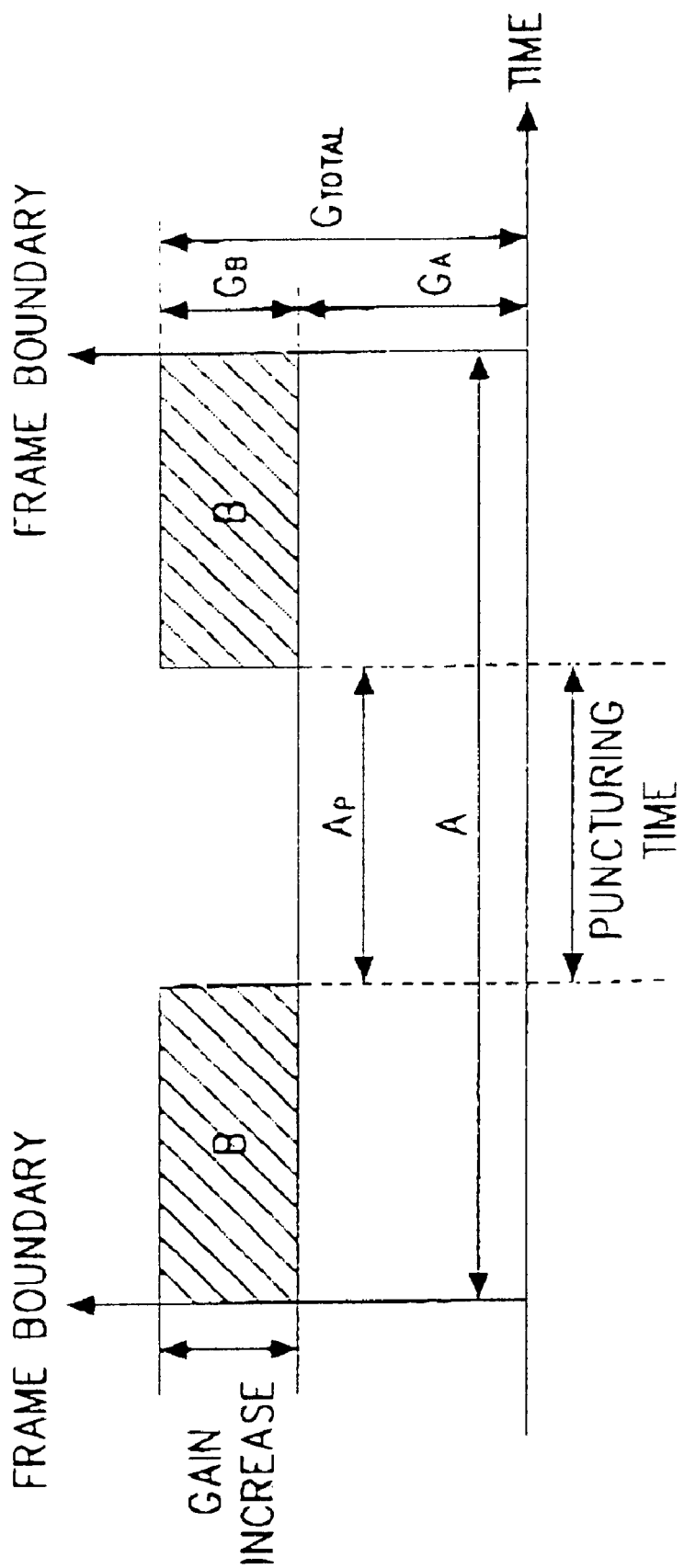
FIG. 2 is a diagram illustrating a gain difference between a punctured frame portion and a non-punctured frame portion.

As described above, the present invention does not compensate the gain of the combined signals from the signal combiner 150 as illustrated in the prior art devices in FIG. 1, but compensates the gain of the traffic signals only and then combines the pilot signals with the compensated traffic signals at the signal combiner 350, thereby leaving the pilot signals uncompensated.

Figure 3:
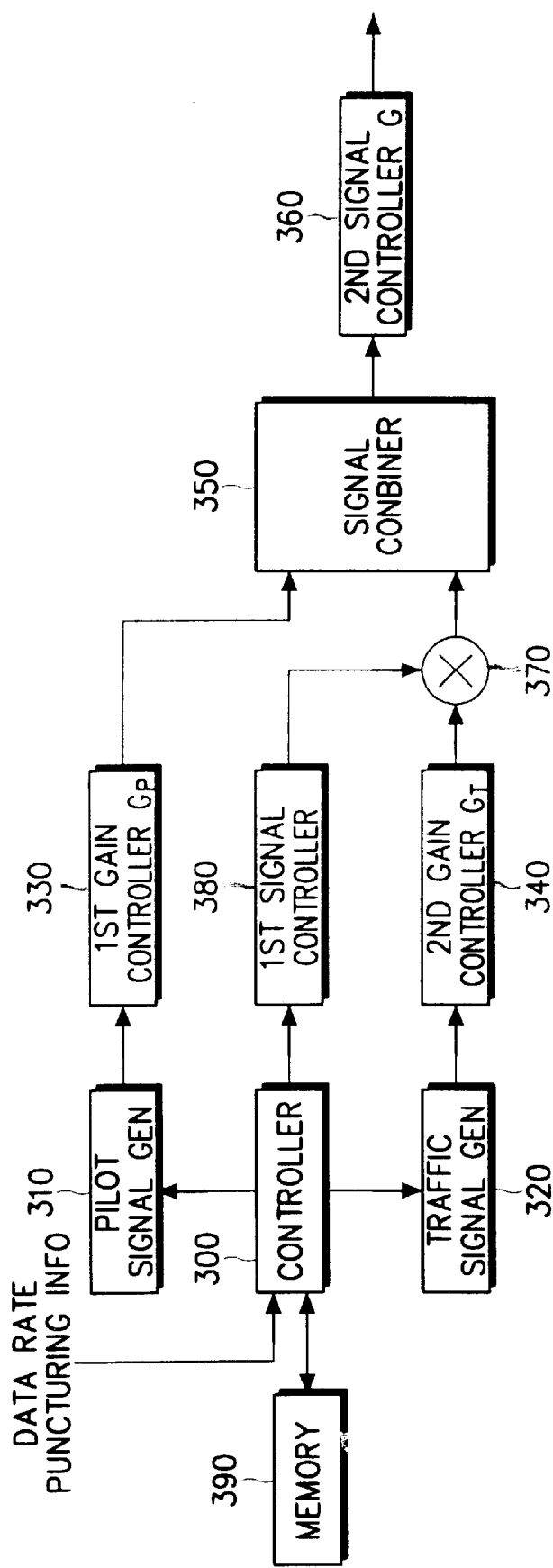
FIG. 3 is a detailed block diagram illustrating a device for controlling gain during transmission of a punctured frame according to an embodiment of the present invention.

FIG. 3 illustrates a more detailed block diagram of the gain control device shown in FIG. 6.

The first signal controller 380 outputs to the multiplier 370 a gain signal having the compensation gain in the gain compensation interval. The multiplier 370 multiplies the traffic signals received from the second gain controller 340 by the gain signal from first signal controller 380 having the compensation gain and outputs the result to the signal combiner 350.

Although the controller 300 calculates the compensation gain in this embodiment, the controller 300 may supply puncturing information received from the upper layer to the first signal controller 380, which then calculates the compensation gain according to the received puncturing information and applies the compensation gain signal having the compensation gain to the multiplier 370.

The gain control device according to the present invention may further comprises a memory 390. The memory 390 is provided with a table of the compensation gains based on the puncturing intervals, i.g., punctured lengths. When another base station with a different frequency is searched for and a puncture occurs, the controller 300 receives a puncturing start time and a puncturing length from the upper layer and retrieves the compensation gain for the puncturing length from the memory 390. Then, the controller 300 applies the compensation gain to the second signal controller 380 to compensate the puncturing interval of the traffic signals.

A. First Embodiment

Figure 4:
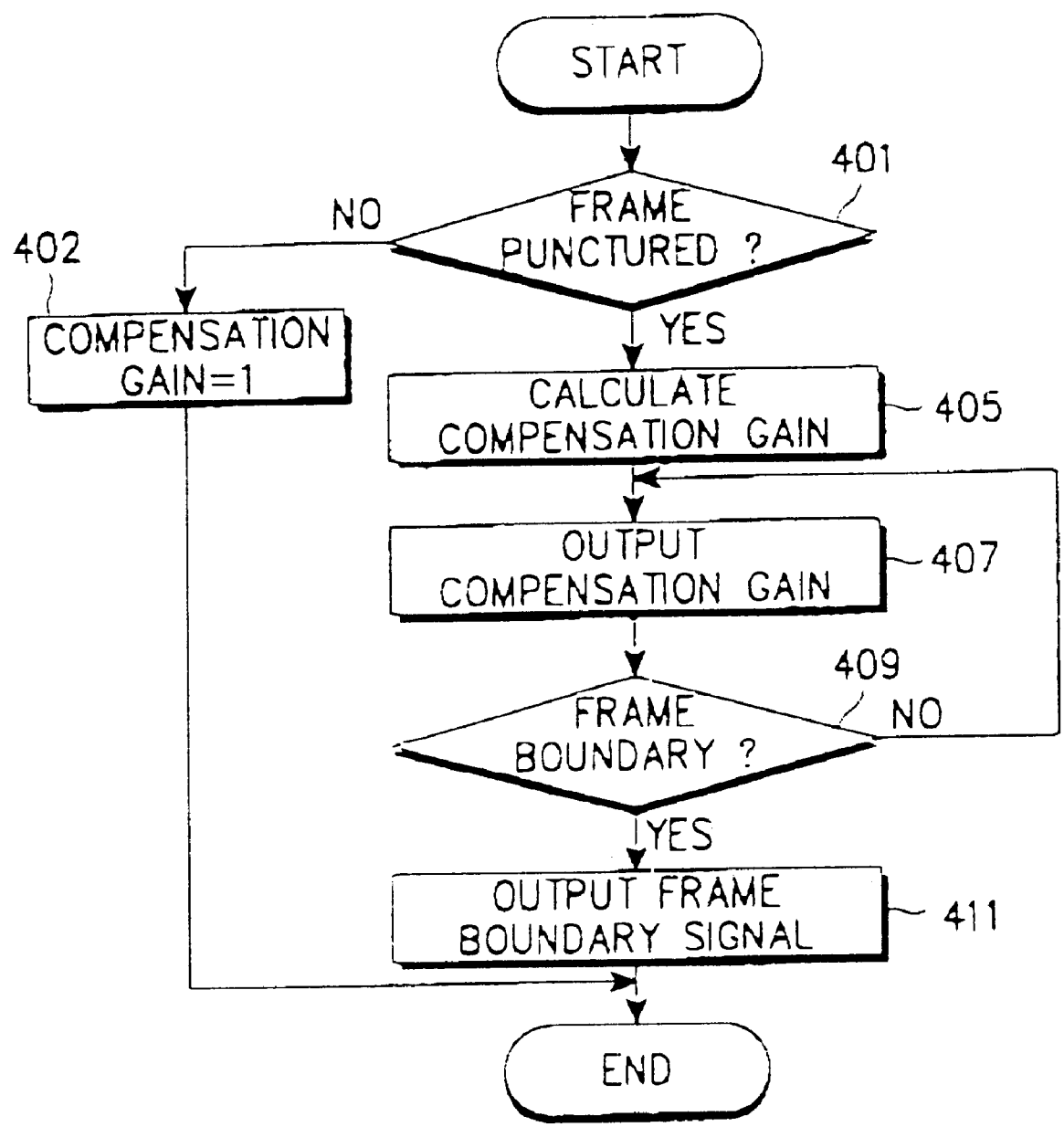
FIG. 4 is a flowchart illustrating a gain control method during transmission of a punctured frame according to a first embodiment of the present invention.

FIG. 4 is a flowchart illustrating a method of varying a ratio of $G_P$ to $G_T$, in which the controller 300 calculates the compensation gain in order to perform gain control.

Referring to FIG. 4, the controller 300 checks in step 401 whether puncturing information is received from the upper layer, to determine whether a frame is punctured or not. If the puncturing information is received from the upper layer, the controller 300 determines a compensation gain from the puncturing information in step 405 and outputs the determined compensation gain to the first signal controller 380 in step 407. At this time, the first signal controller 380 outputs a compensation gain signal having the compensation gain in a non-puncturing interval of the frame. Alternatively, if no puncturing information is received from the upper layer, the controller 300 informs the first signal controller 380 that it will output a compensation gain as "1" at step 402. During a gain compensation for the puncturing interval of the frame, the controller 300 checks in step 409 whether a boundary between the punctured frame and the non-punctured frame is detected, that is, the end of the punctured frame, or the next frame of the punctured frame. Upon detection of the frame boundary, the controller 300 outputs in step 411 a frame boundary signal to the first signal controller 380 to inform that the frame boundary has been detected at step 411. As the frame boundary signal is received, the first signal controller 380 outputs the compensation gain as "1" at step 402. If the frame boundary is not detected at step 409, the compensation gain calculated in step 405 continues to be output to the first controller 380 in step 407.

B. Second Embodiment

Figure 5:
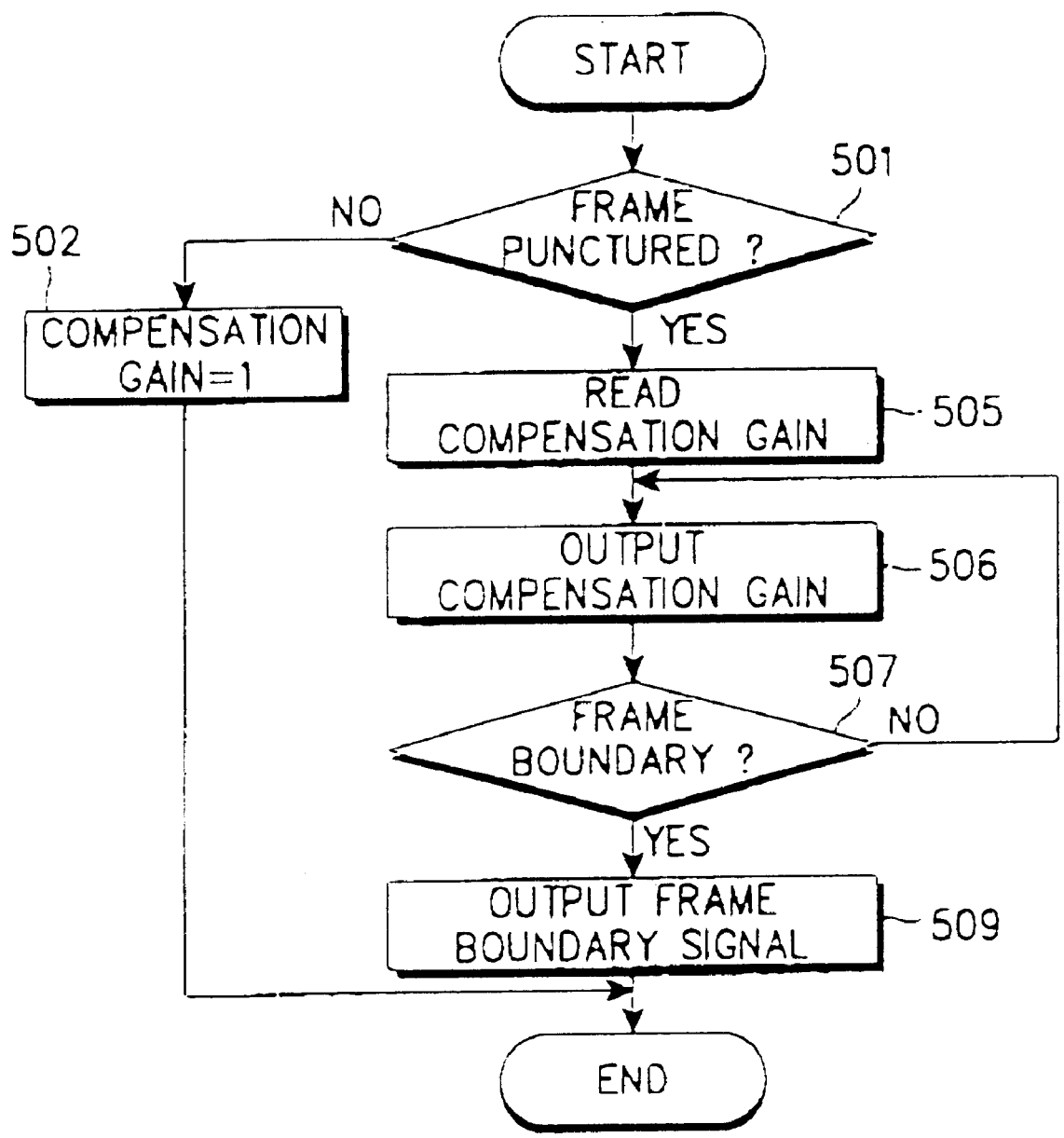
FIG. 5 is a flowchart illustrating a gain control method during transmission of a punctured frame according to a second embodiment of the present invention.

FIG. 5 is a flowchart illustrating a method of varying a ratio of $G_P$ to $G_T$ as a gain control method in transmission of a punctured frame according to a second embodiment of the present invention.

Referring to FIG. 5, the controller 300 checks in step 501 whether puncturing information is received from an upper layer, to determine whether a frame is punctured or not. If the puncturing information is received from the upper layer in step 501, the controller 300 detects a punctured length contained in the puncturing information, retrieves the compensation gain for the punctured length from the memory 390 in step 505 and outputs the compensation gain to the first signal controller 380 in step 506. Alternatively, if no puncturing information is received from the upper layer, the controller 300 informs the first signal controller 380 that it will output a compensation gain as "1" at step 502. During a gain compensation for the puncturing interval of the frame, the controller 300 checks in step 507 whether a boundary between the punctured frame and the non-punctured frame is detected, that is, the end of the punctured frame, or the next frame of the punctured frame. Upon detection of the frame boundary, the controller 300 informs the first signal controller 380 that the frame boundary has been detected at step 509. As the frame boundary signal is received, the first signal controller 380 outputs the compensation gain as "1" at step 502. If the frame boundary is not detected at step 507, the compensation gain calculated in step 505 continues to be output to the first controller 380 in step 506. More specifically, in step 506, the controller 300 outputs a compensation gain value to the first signal controller 380 in the same manner as in step 407 of FIG. 4. The first signal controller 380 then outputs a compensation gain signal having the compensation gain value at non-punctured durations of the punctured frame. However, upon failure to receive puncturing information, the controller 300 enables the first signal controller 380 to output a compensation gain value of "1". During gain compensation for the punctured portions, the controller 300 examines in step 507 whether a boundary of the punctured frame, i.e., an end of the punctured frame or a beginning of a next frame is detected or not, in the same manner as in step 409. Upon detection of the frame boundary, the controller 300 outputs in step 509 a frame boundary signal to the first signal controller 380 to inform detection of the frame boundary. The first signal controller 380 then outputs a compensation gain value of "1".

Accordingly, the mobile communication system according to the present invention can perform an accurate gain control so as to prevent a waste of transmission power at the mobile station, as a result of which the mobile station can enhance its standby time for receiving the input signals.

It is furthermore possible to reduce interference from other channels caused by an unnecessary consumption of transmission power While the invention has been shown and described with reference to certain preferred embodiments thereof, it will be understood by those skilled in the art that various changes in form and details may be made therein without departing from the spirit the scope of the invention as defined by the appended claims.

What is claimed is:

1. In a code division multiple access (CDMA) mobile communication system including a mobile station communicating at a first frequency with a base station, a transmitter of the mobile station for controlling gain of a traffic signal having a punctured time length in a given frame, wherein said punctured time length is a portion of said given frame for searching another base station and said traffic signal is transmitted for the remaining time length except for said punctured time length in said given frame, said transmitter comprising:

a first signal generator for generating a pilot signal;

a second signal generator for generating the traffic signal;

a gain compensator for compensating the gain of the traffic signal for a compensation gain according to the punctured time length therein; and a signal combiner for combining the gain-compensated traffic signal with the pilot signal generated from the first signal generator.

2. The CDMA mobile communication system as claimed in claim 1, wherein the gain compensator comprises:

a controller for calculating the compensation gain to compensate for the gain of the traffic signal according to the punctured time length therein;

a first signal controller for generating a compensation gain signal corresponding to the compensation gain; and a multiplier for multiplying the traffic signal by the compensation gain signal.

3. The CDMA mobile communication system as claimed in claim 1, wherein the gain compensator comprises:

a memory for storing a compensation gain to compensate for the gain of the traffic signal according to the punctured time length therein;

a controller for reading out the compensation gain corresponding to the punctured time length therein;

a first signal controller for generating a compensation gain signal corresponding to the compensation gain; and a multiplier for multiplying the traffic signal by the compensation gain signal.

4. The CDMA mobile communication system as claimed in claim 1, further comprising a second signal controller for controlling the combined signal according to channel circumstances.

5. The CDMA mobile communication system as claimed in claim 1, wherein the compensation gain is defined as $$\text{compensation gain} = \sqrt{\frac{\text{total length of non-punctured frame}}{\text{length of non-punctured portion}}}.$$

6. A method for controlling the gain of transmitting a traffic signal in a CDMA mobile communication system including a mobile station communicating at a first frequency with a base station, wherein the traffic signal has a punctured time length in a given frame, said punctured time length is a portion of said given frame for searching another base station and said traffic signal is transmitted for the remaining time length except for said punctured time length in said given frame, said method comprising the steps of:

generating a pilot signal;

generating a traffic signal;

compensating the gain of the traffic signal for a compensation gain according to the punctured time length therein; and combining the gain-compensated traffic signal with the pilot signal.

7. The gain control method as claimed in claim 6, further comprising the step of controlling transmission gain of the combined signal.

8. A method for controlling the gain of transmitting a traffic signal in a CDMA communication system, including a mobile station communicating at a first frequency with a base station, wherein the traffic signal has a punctured time length in a given frame, said punctured time length is a portion of said given frame for searching another base station and said traffic signal is transmitted for the remaining time length except for said punctured time length in said given frame, said method comprising the steps of:

determining whether puncture information indicating the punctured time length in the given frame has been received from an upper layer;

calculating a compensation gain according to the puncture information;

controlling the transmission gain of the traffic signal by the compensation gain; and upon detection of a frame boundary indicating the end of the given frame, outputting a frame boundary signal for termination of said transmission gain controlling step.

9. The gain control method as claimed in claim 8, wherein the compensation gain is defined as $$\text{compensation gain} = \sqrt{\frac{\text{total length of non-punctured frame}}{\text{length of non-punctured portion}}}.$$

10. The gain control method as claimed in claim 8, wherein the compensation gain is read from a table according to a punctured length of the traffic signal.

* * * * *